(12) United States Patent
Pavani et al.

(10) Patent No.: US 8,542,268 B2
(45) Date of Patent: Sep. 24, 2013

(54) COMPACT MULTI-APERTURE THREE-DIMENSIONAL IMAGING SYSTEM

(75) Inventors: Sri Rama Prasanna Pavani, Santa Clara, CA (US); Jorge Moraleda, Menlo Park, CA (US); David G. Stork, Portola Valley, CA (US); Kathrin Berkner, Los Altos, CA (US)

(73) Assignee: Ricoh Co., Ltd., Tokyo (JP)

( * ) Notice: Subject to any disclaimer, the term of this patent is extended or adjusted under 35 U.S.C. 154(b) by 377 days.

(21) Appl. No.: 13/039,052

(22) Filed: Mar. 2, 2011

(65) Prior Publication Data
US 2012/0224029 A1  Sep. 6, 2012

(51) Int. Cl.
*H04N 13/02* (2006.01)
(52) U.S. Cl.
USPC ............................ 348/47; 348/267; 348/294

(58) Field of Classification Search
USPC .................................................. 348/47, 267
See application file for complete search history.

(56) References Cited

U.S. PATENT DOCUMENTS

| 2005/0128335 A1* | 6/2005 | Kolehmainen et al. ........ 348/340 |
| 2007/0177040 A1* | 8/2007 | Narabu ........................ 348/294 |
| 2009/0128658 A1* | 5/2009 | Hayasaka et al. .......... 348/222.1 |

* cited by examiner

*Primary Examiner* — Christopher S Kelley
*Assistant Examiner* — Kaitlin A Hughes
(74) *Attorney, Agent, or Firm* — Fenwick & West LLP

(57) ABSTRACT

A stereo-imaging system estimates depth based on two images; a multiview-imaging system estimates depth based on two or more images. A passive multiview-imaging system based on a sensor array is designed by considering different candidate partitions of the sensor array into imaging subsystems, especially three or more imaging subsystems.

20 Claims, 5 Drawing Sheets

COMPACT MULTI-APERTURE THREE-DIMENSIONAL IMAGING SYSTEM

BACKGROUND OF THE INVENTION

1. Field of the Invention

This invention relates generally to passive imaging systems with multiple apertures used to estimate three dimensional object positions.

2. Description of the Related Art

Conventional optical systems such as cameras or microscopes use imaging systems to detect two-dimensional images of three-dimensional objects. The dimensionality reduction from three dimensions to two dimensions results in a loss of information, usually a loss that is more prominent in the depth (z) dimension. While the transverse (x,y) dimensions of the object space enjoy close to a one-to-one mapping with the image space, the depth dimension is often reduced to more subtle cues such as defocus, parallax, and perspective, all of which together make it a difficult problem to quantify distances in the third dimension (i.e., to perform depth estimation).

Existing three-dimensional imaging techniques (i.e., imaging techniques that produce x,y,and z information) can be broadly divided into active and passive systems, depending on whether or not a predetermined light pattern or a light pulse is projected onto the object. Active systems, such as the XBOX 360 Kinect, use prior knowledge about the projected pattern to produce quantitative depth estimates. However, active systems require additional equipment to generate and project the light into the scene and they introduce to the scene additional light which is not native to the scene.

In contrast, passive systems produce depth estimates based on light that is naturally scattered from the object, such as room light or sunlight. Stereo-imaging systems are one example of a passive system. A stereo-imaging system acquires images of an object from two different views. The two images are used to triangulate the depth location of object points that appear in both views. In a typical stereo-imaging system, the two images are acquired by two cameras that are separated by a distance, which is referred to the baseline distance. In general, longer baseline distances yield more accurate depth estimates. The uncertainty in the depth estimate is approximately $$\delta \approx \frac{\epsilon Z^2}{ib}, \qquad (1)$$

where $\epsilon$ is the uncertainty in the disparity estimation (i.e., the spatial uncertainty in matching a point in one image to the corresponding point in the other image), Z is the actual depth, i is the distance from the lens to the image (assuming a single thin lens model for the imaging system), and b is the stereo baseline distance. The depth uncertainty $\delta$ can be improved by increasing i, increasing b or decreasing $\epsilon$. However, each of these generally will cause an increase in system size. Increasing i increases the distance from lens to image; increasing b increases the distance between the two cameras; and decreasing $\epsilon$ increases the lens size because E is inversely proportional to the lens diameter. Hence, reducing the depth uncertainty $\delta$ generally requires increasing the system size.

As a result, typical implementations of passive stereo-imaging systems have sizes that are at least of the order of several cubic centimeters. As described above, any reduction in size typically causes a corresponding penalty in performance. This size vs. performance tradeoff makes it challenging to design stereo-imaging systems that are both accurate and compact. The tradeoff is especially problematic if the entire imaging system with both cameras is intended to be implemented using a single sensor array, such as a CMOS or a CCD array sensor chip. These chips are bounded in size, with dimensions that often may be as small as a few square millimeters in surface area. This small size inherently limits the depth accuracy of any such stereo-imaging system.

Thus, there is a need for compact passive imaging systems that can also produce good depth estimates.

SUMMARY OF THE INVENTION

The present invention overcomes the limitations of the prior art by a passive multiview-imaging system for estimating depth in an object. A stereo-imaging system estimates depth based on two images; a "polyview-imaging system" estimates depth based on three or more images. The term "multiview-imaging system" includes both stereo-imaging systems and polyview-imaging systems. The multiview-imaging system comprises a sensor array, two or more imaging subsystems and a processor. Each imaging subsystem captures an image of an object, and includes a portion of the sensor array and corresponding optics. The processor estimates depth in the object based on the captured images. The multiview-imaging system is designed by considering different candidate arrangements of two or more imaging subsystems.

Another aspect of the invention concerns a computer-implemented method for designing passive multiview-imaging systems. A computer system automatically generates different candidate configurations. Each candidate configuration defines a choice of subsystem parameters and a corresponding division of the sensor array into sensor partitions. The candidate configurations have two or more subsystems. A quality metric for each candidate configuration is estimated. The estimate is based on modeling the image capture by the imaging subsystems and the depth estimation by the processor, and calculating a quality metric based on the modeled three dimensional position estimation uncertainty(s). Specifically, the metric is defined so that high quality corresponds to when the uncertainty in the depth estimation is low, and low quality corresponds to when the uncertainty in the depth estimation is high. The quality metrics can be used for various purposes, for example to rank order the candidate partitions or as a cost function to optimize the overall design.

Other aspects of the invention include devices and systems corresponding to the methods described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
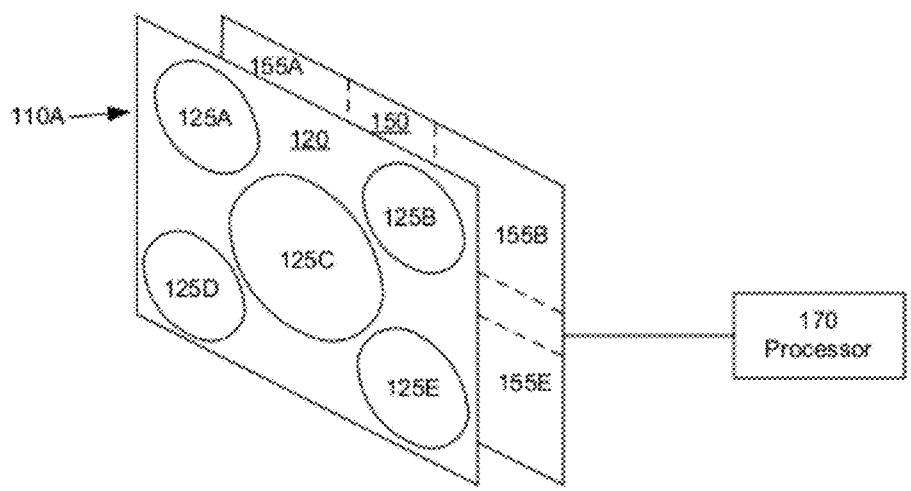
FIG. 1 is a diagram of a multiview-imaging system, in accordance with the invention.

FIG. 1 is a diagram of a multiview-imaging system, in accordance with the invention. A stereo-imaging system captures two images from different viewpoints and processes those two images to estimate depth. The term "polyview-imaging system" will be used to describe a case where three or more images are captured. The term "multiview-imaging system" will be used to describe the generic case, which includes both stereo-imaging systems and polyview-imaging systems.

The multiview-imaging system of FIG. 1 is based on a sensor array 150 coupled to a processor 170. Examples of sensor arrays include CMOS and CCD array sensor chips, including arrays based on multi-chip or multi-die packages. These chips are commonly available in a wide variety of formats and resolutions, including 352×288, 400×400, VGA (640×480), 752×480, 1 MP (1280×800), 2 MP (1600×1200), 3M1' (2048×1536), 5 MP (2592×1944), 8 MP (3264×2448), 9 MP (3488×2616), 10 MP (4320×2430), and 14 MP (4416×3312).

The multiview-imaging system has two or more imaging subsystems 110. In FIG. 1, there are five imaging subsystems 110A-E (only imaging subsystem 110A is labeled), each represented in part by the lens symbol 125A-E in the optics plane 120. Each imaging subsystem 110A-E includes optics 125A-E and a corresponding area 155A-E of the sensor array 150. That is, the sensor array 150 is divided into partitions (five partitions 155A-E in this example), with each partition forming the sensor area 155A-E for the corresponding imaging subsystem 110A-E. Each imaging subsystem 110 captures an image of an object, but from different viewpoints. In imaging subsystem 110A, optics 125A forms an optical image which is captured by sensor area 155A. Thus, the overall system in FIG. 1 captures five images of the object. The processor 170 uses the captured images to estimate depth in the object.

In FIG. 1, the partitions are different sizes (imaging subsystem 110C has a larger aperture than the other imaging subsystems) and they are not laid out on a regular array. In the general case, different partitions can be different sizes and positioned irregularly with respect to the other partitions. However, the partitions may also be laid out in a regular array, such as a rectangular or hexagonal array, with each of the partitions being the same size and shape.

Similarly, the optics 125 for each imaging subsystem can all be the same, or they can be different. Different imaging subsystems can be designed to have different spectral responses and/or polarization responses. The field of view and focal length can also vary, as can the z-position of each imaging subsystem. In one approach, the optics 125 are all variations of a common base design. For example, the base design may be for the imaging subsystem that is in the center of the array (i.e., on-axis field for the entire system), with the variations accounting for parallax and other off-axis effects. The variations might also include different spectral and/or polarization responses, but holding the field of view approximately constant for all imaging subsystems.

Common sensor arrays 150 are based on rectangular arrays of same size sensors with the same performance, although the invention is not limited to this configuration. Different size sensors (including adjustable size sensors), non-rectangular arrays, and non-arrays are all possible variations. In addition, individual sensors can be designed for different performance. For example, gain, sensitivity, response time and spectral response may be different for different individual sensors and/or for sensor areas 155 corresponding to different imaging subsystems 110. Depending on the partitioning, the readout circuitry for the sensor array can also be modified compared to the conventional readout used for a rectangular array that captures a single image.

FIG. 1 is simplified for clarity. It uses symbols to represent the optics 120 and sensor array 150. Both of these components can be more complicated than shown. For example, the optics 120 is not limited to round lenses, all located in a single plane. In addition, the system typically will also include baffles, spacers or other components in the space between the optics 120 and the sensor array 150, for example to reduce crosstalk between the different imaging subsystems.

The processor 170 can also take different forms: for example custom ASIC, programmed DSP, programmed general processor, or software executing on a host computer. Different depth estimation algorithms may be used.

With all these variations, designing a multiview-imaging system is not a trivial task. For example, consider just the decision of how many imaging subsystems should be used. If the sensor array is fixed, then fewer imaging subsystems means higher SNR and higher resolution since each imaging subsystem has a larger aperture and more pixels. It may seem that this would always have higher performance compared to a system with more imaging subsystems, but this is not the case as will be illustrated below.

Figure 2:
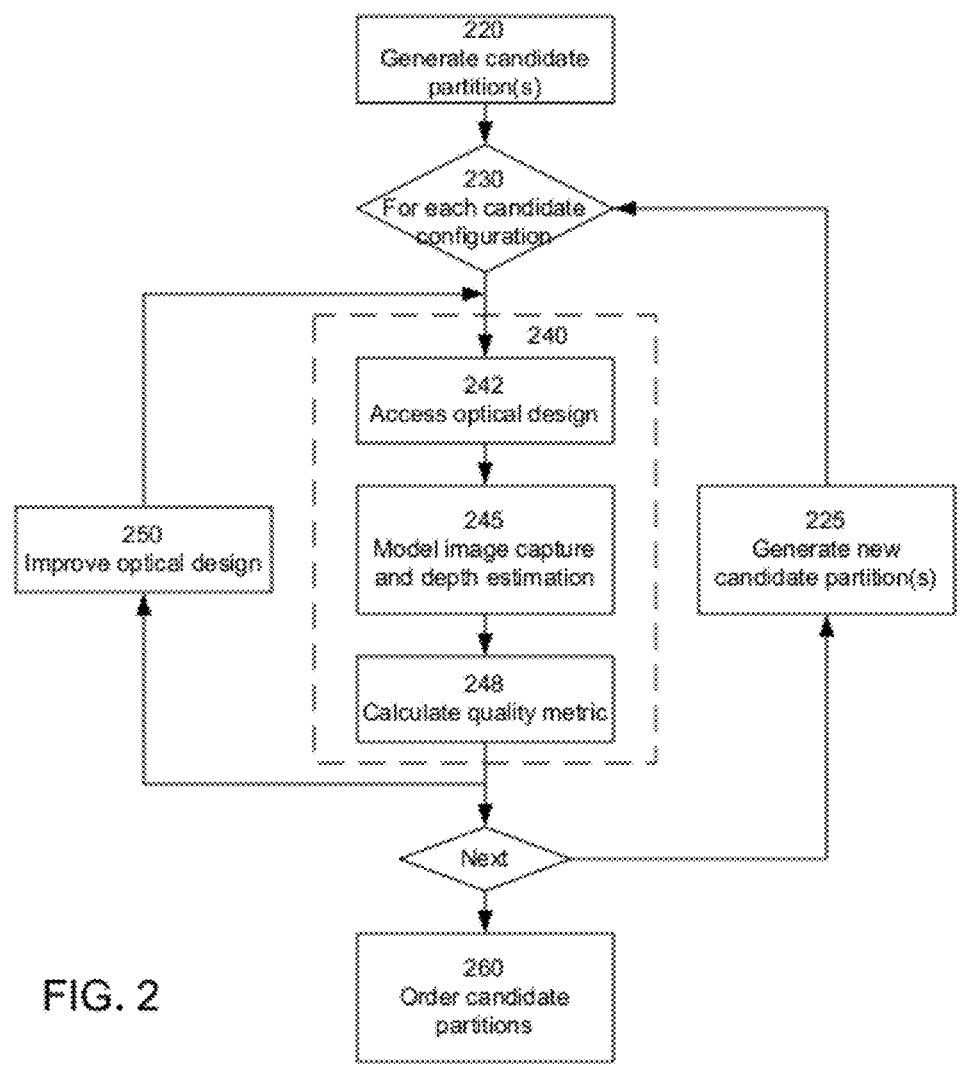
FIG. 2 is a flow diagram of one method for designing a multiview-imaging system, in accordance with the invention.

FIG. 2 is a flow diagram of one method 200 for designing a multiview-imaging system, in accordance with the invention. In step 220, at least one candidate partition is generated. Most of the candidate partitions will have three or more imaging subsystems. Candidate configurations for the multiview-imaging system (including systems with different candidate partitions) are evaluated in loop 230. In this particular example, they are evaluated 240 based on a quality metric for the depth estimation. For a given candidate configuration, the corresponding optical design is accessed 242. The functions of the imaging subsystem (image capture) and of the processor (depth estimation) are modeled 245. The quality metric is calculated 248 based on the modeling of the depth estimation. Optionally, the optical design can be iterated 250 to improve the quality metric. In one approach, all of the candidate partitions are generated 220 first and then evaluated. In another approach (optional step 225), new candidate partitions and configurations are generated 225 based on past analysis. The interior of loop 230 estimates the quality metric for one candidate partition. The different candidate configurations are ordered 260 according to their quality metrics.

The overall design process is subject to certain input specifications and constraints. In more detail, one type of input specification concerns the multiview-imaging system itself. Examples include sensor specifications (e.g., dimensions, pixel size, noise, dynamic range), field of view, focal length or magnification, pre-specified calibration object (checker board, points), expected object properties (spatial and spectral bandwidths, polarization), specification of disparity estimation algorithms, specification of the depth estimation algorithm and manufacturability; environmental, cost and other constraints. A second type of input specification is items that assist in the design, but are not requirements on the multiview-imaging system itself. For example, certain object points may be identified for use in system optimization.

Figure 3:
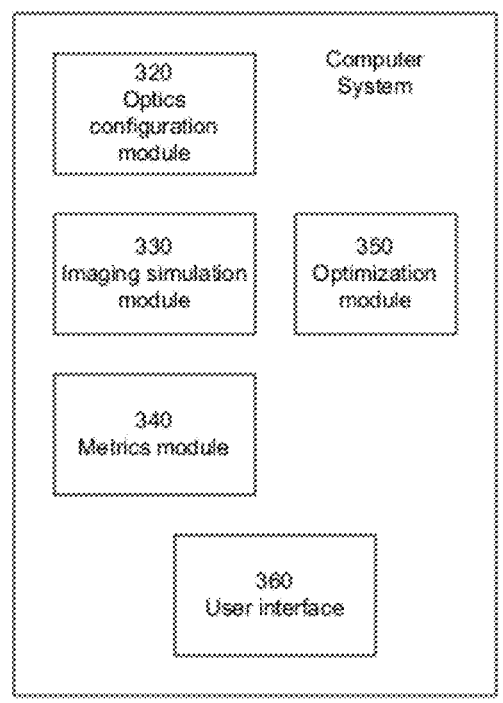
FIG. 3 is a block diagram of a computer system suitable for implementing the method shown in FIG. 2.

FIG. 3 is a block diagram of a computer system suitable for implementing the method shown in FIG. 2. The computer system contains modules that implement different steps in the method of FIG. 2. The optics configuration module 320 specifies different optics. This includes generating the candidate partitions (step 220) and defining the corresponding optics (within step 242). The imaging simulation module 330 models the image capture (part of step 245). The metrics module 340 calculates the quality metric (step 248). The optimization module 350 can be used to iteratively improve the optical design (step 250). A user interface 360 presents results (from step 260).

The design approach of FIGS. 2 and 3 will now be described in more detail, using a specific design example. In this design example, the field of view is 90 degrees and the sensor array is specified to be a 752×480 sensor array with 6 μm pixels and 10-bit A/D resolution. Disparity is estimated using a combination of normalized cross correlation and subpixel centroid estimation, and depth is estimated using the solution provided in Appendix A. Focal length and magnification change for different candidate configurations in order to maintain the specified field of view.

The optics configuration module 320 generates a design for a candidate multiview-imaging system based on the input specifications and possibly also feedback obtained from previous iterations. The candidate design satisfies the mandatory input specifications, while also satisfying spatial constraints such as non-overlapping lenses. Once a design is generated, this module 320 documents the design by identifying the x, y, and z positions of different partitions and their corresponding imaging subsystems, dimensions of the sensor areas for different partitions, optical transfer function(s) which define the response of the optics in the subsystems, and relevant spectral and polarization responses.

The design problem is a multi-dimensional design space. With an understanding of how each dimension is related to the quality metric, boundaries along each dimension could be defined, and mutual relationships among different dimensions could be analyzed. This can reduce the extent of the design space.

Figure 4A:
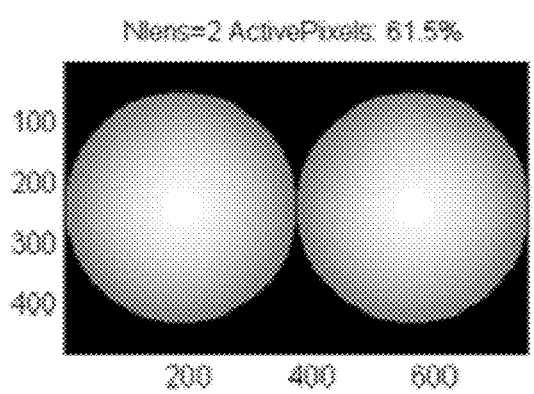
FIGS. 4A-B show candidate partitions for an example design problem.
Figure 4B:
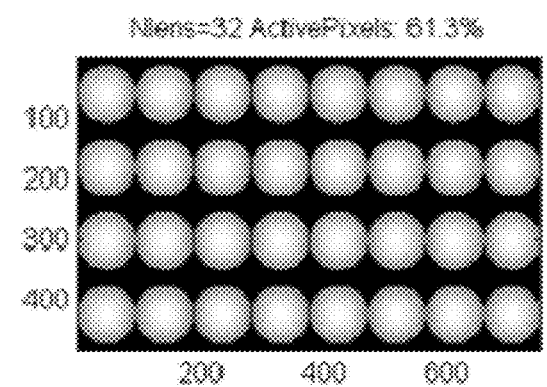

Alternatively, the design space can be reduced in other, specific ways. In the example design problem, the design space was restricted to designs that have $2^n$ same-size partitions laid out in a rectangular array. Furthermore, the clear aperture of each imaging subsystem was constrained to be circular and all lenses were required to be identical. These constraints were based in part on manufacturability considerations. Subject to these constraints, the candidate partitions tried to maximize the clear aperture of the imaging subsystems. FIGS. 4A-B show two candidate partitions. In FIG. 4A, there are two partitions (and two imaging subsystems and two captured images). This is a stereo-imaging system. In FIG. 4B there are 32 partitions (and 32 imaging subsystems and 32 captured images). This is a polyview-imaging system.

The imaging simulation module 330 simulates physical images produced by the imaging subsystems. In this particular example, the simulation is based on a calibration object located at (x,y,z) positions where the system should be optimized. Simulation module 330 first simulates images of these calibration objects, based on geometric optics after accounting for lens distortion. The module 330 then determines the transfer functions for the aberrated imaging subsystems and generates corresponding point spread functions. The point spread functions are convolved with the geometric optics images. Any distinguishing spectral and polarization characteristics are also included in the transfer functions. The resulting aberrated intensity distribution is sampled to account for sensor pixels. Noise is added to simulate both shot and sensor noise, according to the signal-to-noise calculated from the number of detected photons and sensor specifications. Finally, the noisy image intensity distribution is quantized to the number of bits specified by the sensor.

Figure 5A:
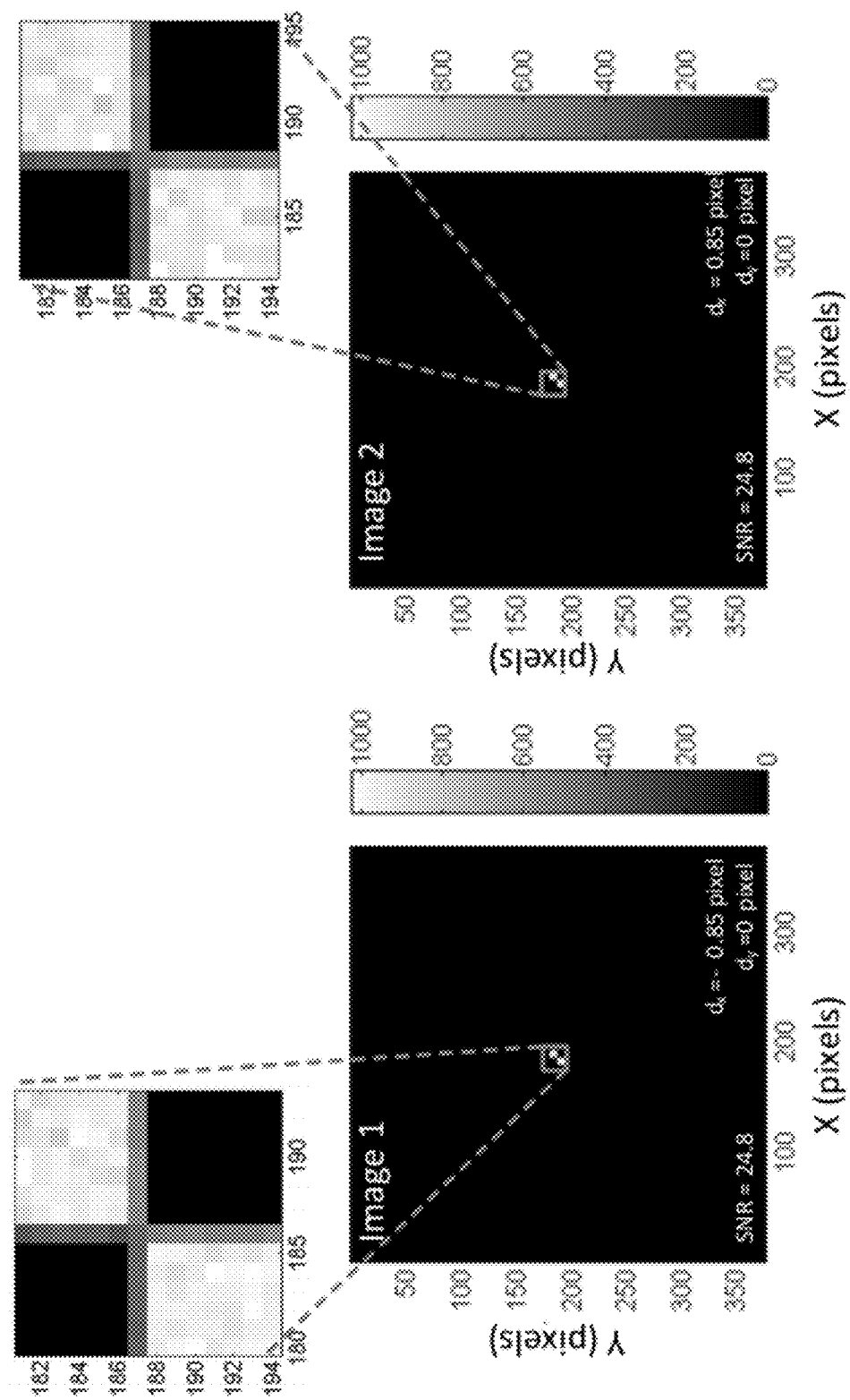
FIGS. 5A-B show simulated images for an example design problem.
Figure 5B:
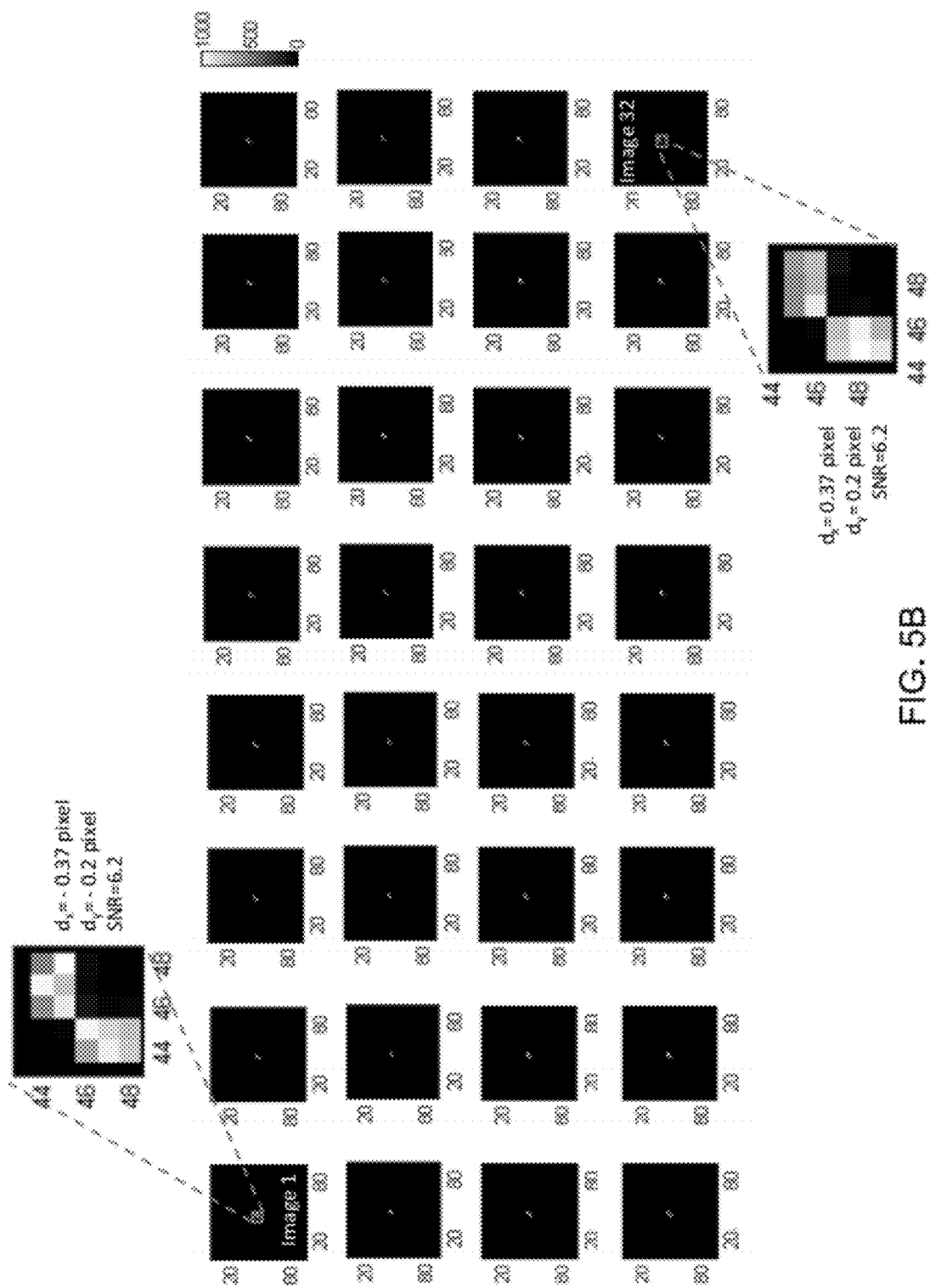

FIGS. 5A-B show simulated grayscale images produced for the example design problem. The calibration object is a checkerboard. FIG. 5A shows a simulated image for the stereo-imaging candidate partition of FIG. 4A, and FIG. 5B shows a simulated image for the 32-lens candidate partition of FIG. 4B. In both cases, the lenses have 0.5 waves of defocus and 0.1 waves of spherical aberration. In each figure, simulated images are shown for all imaging subsystems. The field of view remains the same between the two cases, even as the number of imaging subsystems increases. As a result, the SNR and resolution for each imaging subsystem decrease. In this example, the SNR is measured as the ratio of peak signal to the standard deviation of noise.

The metrics module 340 uses the results from the imaging simulation module 330 to calculate the quality metric. In this example, a disparity matching algorithm is used in combination with a centroid estimator for subpixel image localization for each imaging subsystem. Examples of disparity matching algorithms include Normalized cross-correlation (NCC), sum of absolute differences (SAD), sum of squared differences (SSD), zero-mean SAD, and zero-mean SSD.

These results are then fed into a closed-form analytical solution that minimizes a least-squares error function to estimate the three-dimensional coordinates of an object point. This example uses a closed form analytical solution for the following minimization problem:

Find $(X, Y, Z)$ that minimizes (2)

$$\sum_{i=1}^{K}\left\{\left[\frac{X-l_x^i}{Z-l_z^i}-f_x^i(d_x^i,d_y^i)\right]^2+\left[\frac{Y-l_y^i}{Z-l_z^i}-f_y^i(d_x^i,d_y^i)\right]^2\right\}$$

where K refers to the number of imaging subsystems, $l_x^i$ is the X position of subsystem i, $d_x^i$ is the image position in the X dimension of subsystem i, and $f_x$ is a non-linear subsystem function that relates object space to image space (e.g., to account for distortion). Parameters for the Y dimension are similarly defined. The closed form solution for this problem is given in Appendix A. Thus, the three-dimensional position (X,Y,Z) of an object can be calculated using this closed form solution.

By using a Monte Carlo simulation, many three-dimensional positions (X,Y,Z) can be estimated. The metrics module 340 finds the dimensions ($\delta_x$, $\delta_y$, $\delta_z$) of an uncertainty cloud in X, Y, and Z dimensions that exists around the mean position of the least-squares estimate. The quality metric is a function of the size of this uncertainty cloud. That is, the quality metric is a measure of the uncertainty in the three-dimensional position estimation. For example, one possible quality metric L for three-dimensional imaging is $$L(\delta_x,\delta_y,\delta_z)=\sqrt{\delta_x^2+\delta_y^2+\delta_z^2} \qquad (3)$$

The optimization module 350 can be used to iteratively improve the design for a particular candidate partition, where improvement is measured by the quality metric. Other quality metrics can also be used, for example accounting for systematic errors in the position estimation and/or depth estimation.

Results can be presented to the designer via the user interface 360. In one approach, the computer system simply outputs the best design. In another approach, the computer system rank orders the designs according to quality metric, or graphs the quality metric as a function of the different designs.

Figure 6A:
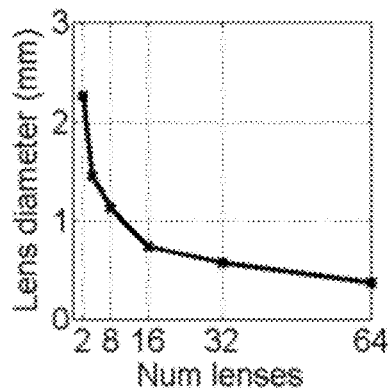
FIGS. 6A-B and 7A-C present results for the example design problem.
Figure 6B:
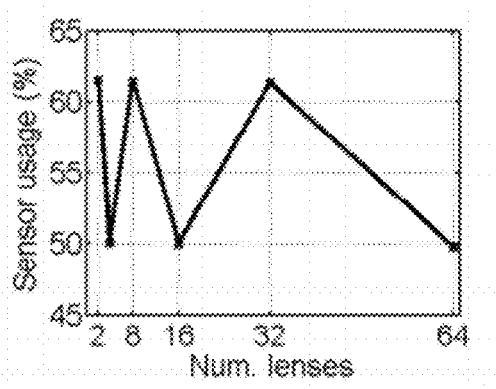
Figure 7A:
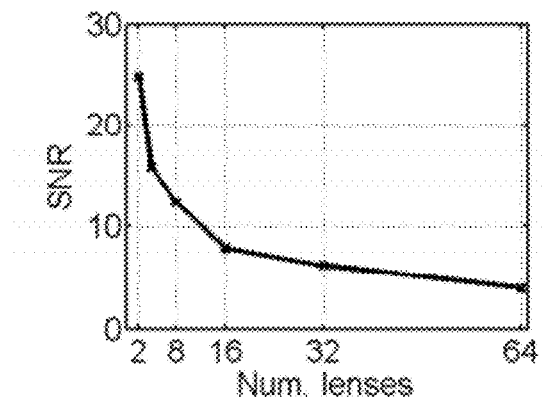
Figure 7B:
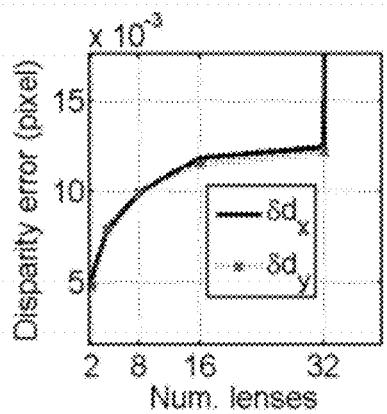

FIGS. 6A-B and 7A-C present results for the example design problem. Recall that this design problem was constrained to have $2^n$ partitions. FIG. 6A graphs the lens diameter for a single imaging subsystem as a function of the number of partitions (i.e., the number of lenses). As the number of partitions increases, each individual lens decreases in size. FIG. 6B graphs the clear aperture fill factor as a function of the number of partitions. The fill factor is the total clear aperture occupied by all imaging subsystems, compared to the total available area. The dominant factor here is that the design is constrained to have circular apertures on a rectangular array, resulting in unused area. FIG. 7A graphs the SNR for each imaging subsystem. The SNR drops as the number of partitions increases, because each partition is smaller and collects less light. FIG. 7B graphs the disparity uncertainty. The quantities $\delta d_x$ and $\delta d_y$ are the standard deviations of the disparity in the x-direction $d_x$ and in the y-direction $d_y$, respectively.

Figure 7C:
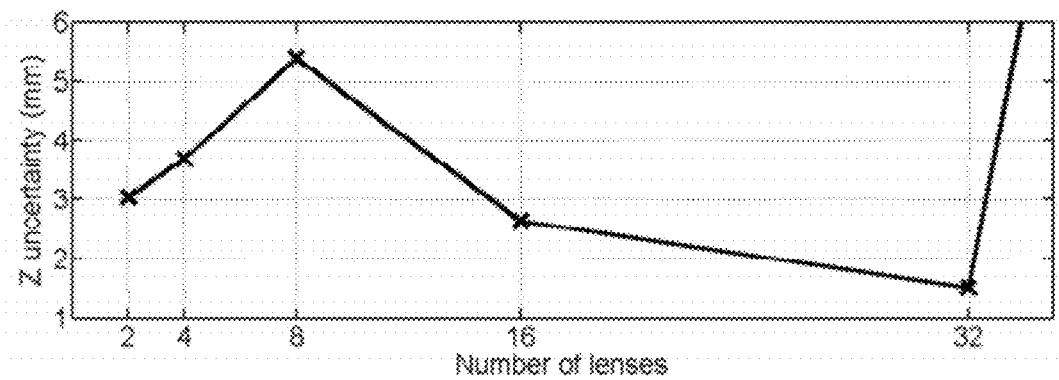

FIG. 7C plots the depth uncertainty as a function of the number of partitions. Perhaps surprisingly, the 32-view imaging system has the lowest depth uncertainty. As the number of lenses increases, there are some factors that contribute to increasing depth error and some that contribute to decreasing the error. An increase in N comes with a decrease in SNR and resolution, thereby increasing the disparity error and consequently increasing the depth error. At the same time, however, an increase in N also comes with a larger number of views of the same object, creating both horizontal and vertical parallax. Some of these views look at the object at much more steeper angles than in the stereo case. In the 32 lens case, the additional views provide enough extra depth information to overcome the effects of lower SNR and resolution.

Multiaperture based compact three-dimensional imaging systems can find applications in automobiles, consumer electronics, factory automation, biomedical, and robotics for object detection, tracking, recognition, and classification. These systems overcome the limitations of stereo in situations where both size and performance are important. With the use of quality metrics that appropriately weight performance in each of the three dimensions, multiple aperture systems can be optimized to make better use of sensor area compared to a stereovision imaging system. In one application using a 752× 480 sensor, each subsystem uses only 50×50 pixels. Other applications may have a primary subsystem occupying over half the number of pixels, and a number of secondary subsystems dividing the rest of the sensor area. Depending on application requirements, the field of view may be anywhere from 30 degrees to 180 degrees.

Although the detailed description contains many specifics, these should not be construed as limiting the scope of the invention but merely as illustrating different examples and aspects of the invention. It should be appreciated that the scope of the invention includes other embodiments not discussed in detail above. For example, other implementations can be based, on non-identical subsystems with different sizes, axial and transverse positions, optical transfer functions, spectral responses, and/or polarization characteristics. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

In alternate embodiments, aspects of the invention can be implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

APPENDIX A

The following are analytical solutions of the minimization problem in Eqn (2):

$$x \to -\frac{1}{k}\left(-Lx - \frac{Fx^2 Lx}{2(-2Fx^2 - 2Fy^2)} - \frac{FxFyLy}{2(-2Fx^2 - 2Fy^2)} - \frac{FxkMx}{2(-2Fx^2 - 2Fy^2)} - \frac{FxkMy}{2(-2Fx^2 - 2Fy^2)} + \frac{Fx\sqrt{(-FxLx - FyLy - kMx - kMy)^2 - 4(-2Fx^2 - 2Fy^2)(Lx^2 + Ly^2 - kWx - kWy)}}{2(-2Fx^2 - 2Fy^2)}\right)$$

$$y \to -\frac{1}{k}\left(-\frac{FxFyLx}{2(-2Fx^2 - 2Fy^2)} - Ly - \frac{Fy^2 Ly}{2(-2Fx^2 - 2Fy^2)} - \frac{FykMx}{2(-2Fx^2 - 2Fy^2)} - \frac{FykMy}{2(-2Fx^2 - 2Fy^2)} + \frac{Fy\sqrt{(-FxLx - FyLy - kMx - kMy)^2 - 4(-2Fx^2 - 2Fy^2)(Lx^2 + Ly^2 - kWx - kWy)}}{2(-2Fx^2 - 2Fy^2)}\right)$$

$$z \to \frac{1}{2(-2Fx^2 - 2Fy^2)}\left(FxLx + FyLy + kMx + kMy - \sqrt{(-FxLx - FyLy - kMx - kMy)^2 - 4(-2Fx^2 - 2Fy^2)(Lx^2 + Ly^2 - kWx - kWy)}\right)$$

where $$L_x = \sum_{i=1}^{K} l_x^i \qquad F_x = \sum_{i=1}^{K} f_x^i(d_x^i, d_y^i)$$

$$L_y = \sum_{i=1}^{K} l_y^i \qquad F_y = \sum_{i=1}^{K} f_x^i(d_i^x, d_y^i)$$

$$W_x = \sum_{i=1}^{K} (l_x^i)^2 \qquad M_x = \sum_{i=1}^{K} l_x^i f_x^i(d_x^i, d_y^i)$$

$$W_y = \sum_{i=1}^{K} (l_y^i)^2 \qquad M_y = \sum_{i=1}^{K} l_y^i f_y^i(d_x^i, d_y^i)$$

What is claimed is:

1. A method for designing a passive multiview-imaging system based on a sensor array and a processor, the sensor array divided into partitions, each partition forming a sensor area for a corresponding imaging subsystem, each imaging subsystem capturing an image of an object, the processor estimating depth in the object based on the captured images, the design method comprising a computer system performing the steps of:
automatically generating a plurality of different candidate partitions, each candidate partition defining a division of the sensor array into two or more sensor areas, wherein at least some of the candidate partitions divide the sensor array into three or more sensor areas;
estimating a quality metric for each candidate partition, comprising:
accessing an optical design for the corresponding imaging subsystems for the candidate partition;
modeling the image capture by the imaging subsystems and the depth estimation by the processor, the modeling taking into account the input specifications; and
estimating the quality metric based on the modeled depth estimation; and
ordering the candidate partitions according to their estimated quality metrics.

2. The method of claim 1 wherein all of the automatically generated candidate partitions divide the sensor array into a regular array of sensor areas.

3. The method of claim 2 wherein all of the automatically generated candidate partitions divide the sensor array into a rectangular array of sensor areas.

4. The method of claim 1 wherein at least one of the automatically generated candidate partitions divides the sensor array in a manner that is not a regular array of sensor areas.

5. The method of claim 1 wherein the step of the computer system automatically generating a plurality of different candidate partitions generates only candidate partitions that are consistent with manufacturability constraints in the input specifications.

6. The method of claim 1 wherein a majority of the candidate partitions divide the sensor array into three or more sensor areas.

7. The method of claim 1 wherein not more than one of the candidate partitions divides the sensor array into two sensor areas.

8. The method of claim 1 wherein the quality metric comprises an error in a three-dimensional position estimation.

9. The method of claim 1 wherein the quality metric comprises an uncertainty in a three-dimensional position estimation.

10. The method of claim 1 wherein the step of estimating the quality metric comprises:
using a closed form solution to estimate a three-dimensional position (X,Y,Z) of an object.

11. The method of claim 1 wherein the step of estimating the quality metric comprises:
using a Monte Carlo approach to estimate uncertainty in a three-dimensional position (X,Y,Z) of an object.

12. The method of claim 1 wherein the step of the computer system estimating the quality metric comprises:
estimating a disparity of the candidate partition; and
estimating the quality metric based on the disparity.

13. The method of claim 1 wherein the optical designs for all of the imaging subsystems are the same.

14. The method of claim 1 wherein the optical designs for all of the imaging subsystems are variations of a common base optical design.

15. The method of claim 1 wherein, for at least two of the imaging subsystems, their corresponding optical designs have different spectral responses, different transfer functions and/or different polarization responses.

16. The method of claim 1 wherein the step of estimating a quality metric for each candidate partition further comprises:
the computer system modifying the depth estimation by the processor to improve the quality metric.

17. The method of claim 1 wherein the step of ordering the candidate partitions comprises:
the computer system identifying the candidate partition with the best quality metric.

18. The method of claim 1 wherein the step of ordering the candidate partitions comprises:
the computer system rank ordering the candidate partitions by quality metric.

19. The method of claim 1 wherein the step of ordering the candidate partitions comprises:
the computer system presenting the quality metric as a function of an aspect of the candidate partitions.

20. A passive polyview-imaging system for estimating depth in an object, the polyview-imaging system comprising:
a sensor array, the sensor array divided into at least two sensor areas;
a plurality of imaging subsystems, each imaging subsystem comprising one of the sensor areas and corresponding optics, each imaging subsystem capturing an image of an object; and
a processor coupled to the sensor array, for estimating depth in the object based on the captured images;
wherein the passive polyview-imaging system is produced by a process comprising a computer system performing the steps of:
automatically generating a plurality of different candidate partitions, each candidate partition defining a division of the sensor array into two or more sensor areas;

estimating a quality metric for each candidate partition, comprising:
    accessing an optical design for the corresponding imaging subsystems for the candidate partition;
    modeling the image capture by the imaging subsystems and the depth estimation by the processor; and
    estimating the quality metric based on the modeled depth estimation; and ordering the candidate partitions according to their estimated quality metrics.

* * * * *